Patented Oct. 13, 1936

2,057,433

UNITED STATES PATENT OFFICE 2,057,433

TREATMENT OF HYDROCARBON OILS

Vladimir Ipatieff, Chicago, Ill., assignor to Universal Oil Products Company, Chicago, Ill., a corporation of Delaware No Drawing. Application May 23, 1934, Serial No. 727,105

5 Claims. (Cl. 196—10)

This invention relates more particularly to the treatment of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum, in gas making processes and as by-products in various chemical industries. In general they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinic constituents. The manufacture of secondary alcohols such as iso-propyl alcohol and others by first absorbing the corresponding olefins in cracked gases in sulfuric acid and then hydrolyzing the acid esters has been undertaken to a limited extent. The olefins present in cracked hydrocarbon mixtures of gasoline boiling range are of moderately high antiknock value, but a certain percentage of these is too highly unsaturated, and this must be removed by chemical treatment, usually with sulfuric acid, to insure proper stability of the gasoline under storage conditions.

The present process provides for more effectively utilizing the olefinic constituents of commercial hydrocarbon mixtures, particularly those occurring in the gases from oil cracking processes to produce valuable derivatives therefrom and it may also be applied to individual olefins produced by special chemical methods or by fractionation of mixtures.

In one specific embodiment the invention comprises treatment of normally gaseous olefin hydrocarbons at elevated temperatures to produce polymers therefrom utilizable as constituents of motor fuel with solid contact materials or catalysts comprising pyrophosphoric acid and carrying or spacing materials of a porous and adsorptive character.

The present process is particularly directed to the production of dimers and trimers from monoolefins, particularly such olefins whose lower polymers boil at temperatures within the approximate range of commercial motor fuel, say, for example, from 100 to 400° F. It has been found that the dimers and some of the trimers of propylene, the butylenes and amylenes boil within this range and furthermore that these compounds have unusually high anti-knock characteristics. The following table shows the approximate boiling points of the dimers of propylene, butylenes, amylenes and hexylenes which will occur in appreciable quantities in the gases from oil cracking processes.

Boiling points of olefin dimers

| | ° F. |
|---|---|
| Hexylene | 155 |
| Octylene | 255 |
| Decylene | 323 |
| Dodecylene | 417 |

Of the lower boiling and normally gaseous olefins, ethylene is the most resistant to polymerization by catalysts of the present character, but in the presence of its higher homologs it is possible that a certain amount of mixed polymers are formed.

Polymers of higher molecular weight than the di- and tri-molecular compounds are generally of too high boiling point to be used in commercial gasolines and the end products of too extensive polymerization are resinous pitchy solids which are entirely unsuitable.

The essential active ingredient of the solid catalysts which are employed in polymerizing olefins according to the present process is pyrophosphoric acid, which may constitute 60% or more of the catalyst mixture. It has been found that this acid is readily incorporated with various types of absorbent materials to produce homogenous solid catalysts and that, by utilizing this acid which represents a lower degree of hydration of phosphorus pentoxide than orthophosphoric acid, the time necessary for drying and preparing such solid contact materials for use is considerably shortened, as will appear in later example. Pyrophosphoric acid has the general formula $H_4P_2O_7$ and the double oxide formula $P_2O_5.2H_2O$. It melts at 61° C. and has considerable fluidity at the temperatures which have been found to be most convenient for mixing with the adsorbent materials.

The pyrophosphoric acid is employed in granular or pulverulent form, this being accomplished by the alternative use of a number of different absorbent carrying materials which vary somewhat in their absorptive capacity and also in their chemical and physical properties and their influence upon the catalytic effect of the mixtures.

The materials which may be employed are divisible roughly into two classes. The first class comprises materials of a predominately siliceous character and includes diatomaceous earth, kieselguhr and artificially prepared porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which may be employed either alone or in conjunction with the first class (and with certain other optional ingredients to be later described) comprises generally certain members of the class of aluminum silicates and includes such naturally occurring substances as pumice, the various fuller's earths and clays such as bentonite, montmorillonite, et cetera. The class also includes certain artificially prepared aluminum silicates of which the products known as Tonsil and Filtrol are representative, these substances being in a sense purified aluminum silicates made by treating certain selected clays with hydrochloric or other mineral acid and washing out the reaction products. The naturally occurring or specially treated substances in this general class are characterized by a high adsorptive capacity which is particularly in evidence in making up the present type of phosphoric acid catalyst, and they may also contain traces of active ingredients which assist in producing the desired polymerizing effects. Again each substance which may be used alternatively will exert its own specific influence which will not necessarily be identical with that of the other members of the class.

In some cases the structure of the solid pyrophosphoric acid catalyst may be improved by the primary incorporation of organic materials which yield a carbonaceous residue on heating. Substances which may be used in this manner include such materials as cellulose, starches, sugars, glue, gelatin, flour, molasses, agar-agar, et cetera. They evidently function as binders to some extent to prevent the breakdown of the catalyst structure when subjected to elevated temperatures and the action of hydrocarbon vapors or liquids in service. The different members of this class of materials will each exert their particular selective and characteristic action upon the physical structure of the material finally produced. Only broad rules can be given for the best temperatures of burning for masses containing carbonaceous materials. Some of the material may be oxidized by the pyrophosphoric acid thus enhancing the porosity of the resultant product.

The pyrophosphoric acid may be incorporated, if desired, with activated carbons or chars from different sources such as those produced from wood, coal and petroleum and in such cases the best conditions for drying and hardening the composite material will be determined as a result of preliminary experiments on a small scale.

Catalysts of the character comprised within the scope of the present invention are producible by a series of relatively simple steps comprising generally: mixing the pyrophosphoric acid and a selected adsorbent material in proper proportions, preferably at temperatures within the approximate range of 120 to 180° C., further heating at temperatures of approximately 180 to 300° C. and grinding and sizing the resultant product to produce particles of the desired size. The catalyst may be used in particle sizes of from approximately 4 to 20 mesh or may be made up into small briquettes. When carbonaceous materials are used somewhat higher temperatures may be employed to decompose them. The optimum temperature of heating when employing these materials varies considerably. Good results have been obtained at 300° C. and in some instances it would appear that too high temperatures above this point have a deleterious effect. The exact maximum temperature employed in the calcining step will be to some extent a matter of trial.

Catalysts of the present character are hygroscopic to a variable extent and are best ground, sized and preserved for use out of contact with moist air.

Owing to the possibility of varying on the one hand, the proportion of active acid ingredient and on the other hand the type of adsorbent material which goes to form the catalyst masses, a number of alternatives exists each of which will have its own peculiar catalyzing and polymerizing character which will not be exactly equivalent to masses of different composition.

The polymerizing of gaseous olefins with catalysts of the present character may be brought about under numerous combinations of temperature and pressure, though the best results for any given pure olefin or mixture of olefins such as those encountered in the gases from oil cracking plants, will usually correspond to a particular set of conditions. It is a feature of the present type of catalyst that treatments may be conducted at temperatures between 50° C. and 350° C. and superatmospheric pressures from 25 to 1000 pounds per square inch without danger of overpolymerization resulting in the formation of heavy tar-like polymers instead of liquids of gasoline boiling range.

In using the catalysts only simple equipment is necessary such as a tube or tower in which the catalyst is placed as a filling material. The gases may be pumped up to some given pressure and preheated to a suitable temperature prior to passage through the catalyst mass or the catalyst chamber may be heated externally if desired. A few test runs will usually determine the best conditions of operation. For example, if the temperatures and pressures employed are such that the products exist in vapor phase, the flow of the gases through the catalyst may be upward through filled towers while if liquids are condensed, the best results may be obtained when down flows are used so that liquid does not accumulate on the surface of the catalyst.

Solid catalysts comprising pyrophosphoric acid are characterized by their ability to polymerize olefins to produce relatively low boiling hydrocarbon polymers rather than heavy tars or pitches and by their long life due to the absence of such highly carbonaceous reaction products and also due to lack of oxidizing tendency in the acid of phosphorus which constitutes the major portion thereof. In contrast to this it is notable that when employing sulfuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced, so that it is not possible to produce more than minor amounts of desired low boiling hydrocarbons without the concurrent production of large quantities of heavy materials. Furthermore, catalysts of the present character are readily regenerated after they have been contaminated by surface carbon deposits after long periods of service by merely burning off the deposits with air or other oxidizing gas at moderate temperatures. A still further advantage resides in the fact that they are substantially of a non-corrosive character as compared with the decided corrosive action of liquid phosphoric acid and some other liquid polymerizing agents. The peculiar structural strength of catalyst masses of the present type has already been noted but may be mentioned again in connection with the general advantages which they possess, this being of special commercial value.

The following example is given to show the general steps of preparing catalysts for use and to indicate the results obtainable with them in commercial practice. While it is properly illustrative, it is only one of a large number which could be cited so that the data given are not to be construed as imposing corresponding limitations upon the scope of the invention.

Commercial pyrophosphoric acid containing from 78 to 79% of phosphorus pentoxide by weight was mixed with a bentonite clay in the approximate weight proportions of 75% of the acid and 25% of the clay. The mixing was done at a temperature of 180 to 200° C. in a mechanical mixer. The batch of catalyst solidified rapidly and was removed from the mixer and dried at from 250 to 270° C. for 20 hours after which the composite was crushed and screened to make particles of approximately 10 to 20 mesh.

The sized particles were charged into a vertical treating tower and a gas mixture from the stabilizer of an oil cracking plant containing 25% of olefins including propylene and higher was passed downwardly through the catalyst at a temperature of 400° F. and a pressure of 100 pounds per square inch.

This operation produced 5.0 gallons of gasoline boiling range liquids for each 1000 cubic feet of gas mixture treated. The properties of the untreated product are shown in the following table, the figures being the average for a run of several days' duration:

*Properties of gasoline hydrocarbons*

| | |
|---|---|
| Gravity, ° A. P. I. | 66.0 |
| Initial boiling point | 105°F. |
| 50% over at | 245°F. |
| 90% over at | 425°F. |
| End boiling point | 460°F. |
| Distillation loss | 3.5% |
| Color, Saybolt | 27 |
| Mg. of gum by copper dish | 35 |
| Blending octane number—Research method | 110 |

A light caustic treatment and a distillation to produce 410° F. end point product gave a gasoline satisfactory in all respects and stable under storage with the addition of 0.01% of a commercial inhibitor consisting of a selected fraction of hardwood tar.

The character of the invention and the marked commercial value thereof can be seen from a consideration of the preceding specification and the single instance of results given but neither is to be considered as imposing corresponding limitations upon the generally broad scope of the invention. The use, in the polymerization of olefin gases, of calcined mixtures of phosphoric acids to adsorbent or siliceous materials, is claimed more broadly in my copending application Ser. No. 678,933, filed July 3, 1933, now Patent No. 1,993,513, issued March 5, 1935.

I claim as my invention:

1. A process for the conversion of normally gaseous olefins into liquid hydrocarbons which comprises subjecting olefinic gas at polymerizing temperature to the action of a solid catalyst comprising a calcined mixture of pyrophosphoric acid and a solid adsorbent.

2. A process for the conversion of normally gaseous olefins into liquid hydrocarbons which comprises subjecting olefinic gas at polymerizing temperature to the action of a solid catalyst comprising a calcined mixture of pyrophosphoric acid and a siliceous material.

3. A process for the conversion of normally gaseous olefins into liquid hydrocarbons which comprises subjecting olefinic gas at polymerizing temperature to the action of a solid catalyst comprising a calcined mixture of pyrophosphoric acid and kieselguhr.

4. A process for the conversion of normally gaseous olefins into liquid hydrocarbons which comprises subjecting olefinic gas at polymerizing temperature to the action of a solid catalyst comprising a calcined mixture of pyrophosphoric acid and an adsorbent earth.

5. A process for the conversion of normally gaseous olefins into liquid hydrocarbons which comprises subjecting olefinic gas at polymerizing temperature to the action of a solid catalyst comprising a calcined mixture of a major proportion of pyrophosphoric acid and a minor proportion of a siliceous material.

VLADIMIR IPATIEFF.